(12) United States Patent
Hashimoto et al.

(10) Patent No.: US 6,810,907 B2
(45) Date of Patent: Nov. 2, 2004

(54) HYDRAULIC TENSIONER WITH RELIEF VALVE MECHANISM

(75) Inventors: Hiroshi Hashimoto, Osaka (JP);
Yoshio Kurokawa, Osaka (JP);
Tsutomu Namie, Osaka (JP);
Nobuyuki Fujimoto, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 243 days.

(21) Appl. No.: 10/264,193

(22) Filed: Oct. 3, 2002

(65) Prior Publication Data

US 2003/0070717 A1 Apr. 17, 2003

(30) Foreign Application Priority Data

Oct. 12, 2001 (JP) ........................................ 2001-315469

(51) Int. Cl.[7] .............................. F16H 7/08; F16K 17/04
(52) U.S. Cl. ...................................... 137/514.5; 474/110
(58) Field of Search .............................. 137/514, 514.3, 137/514.5; 474/109, 110

(56) References Cited

U.S. PATENT DOCUMENTS

| | | | |
|---|---|---|---|
| 4,874,352 A | * | 10/1989 | Suzuki ........................ 474/110 |
| 5,109,813 A | | 5/1992 | Trzmiel et al. |
| 6,193,623 B1 | * | 2/2001 | Koch et al. .................. 474/110 |
| 6,196,939 B1 | * | 3/2001 | Simpson ..................... 474/110 |
| 6,398,682 B1 | * | 6/2002 | Suzuki et al. ............... 474/110 |
| 2001/0006917 A1 | | 7/2001 | Hashimoto |

FOREIGN PATENT DOCUMENTS

| | | |
|---|---|---|
| DE | 100 65 059 A1 | 12/2000 |
| GB | 2 352 794 A | 2/2001 |
| JP | 2000-240744 A | 9/2000 |
| JP | 2001165251 | 6/2001 |

\* cited by examiner

*Primary Examiner*—Ramesh Krishnamurthy
(74) *Attorney, Agent, or Firm*—Howson and Howson (57) ABSTRACT

In a hydraulic tensioner having a relief valve mechanism in which a spring-biased valve element is reciprocable in a bore, hitting sounds produced by collision of the relief valve element with a plug in the bore, and wear and breakage of the biasing spring, are prevented by providing an oil relief hole in a peripheral wall of the relief valve bore at a position where it is closed by the relief valve element when he relief valve element is moved by a rapid increase in oil pressure.

5 Claims, 8 Drawing Sheets

HYDRAULIC TENSIONER WITH RELIEF VALVE MECHANISM

FIELD OF THE INVENTION

This invention relates to hydraulic tensioners used to apply proper tension to a timing chain, belt, or the like in a vehicle engine, and more particularly to a tensioner having a relief valve mechanism.

BACKGROUND OF THE INVENTION

Figure 9:
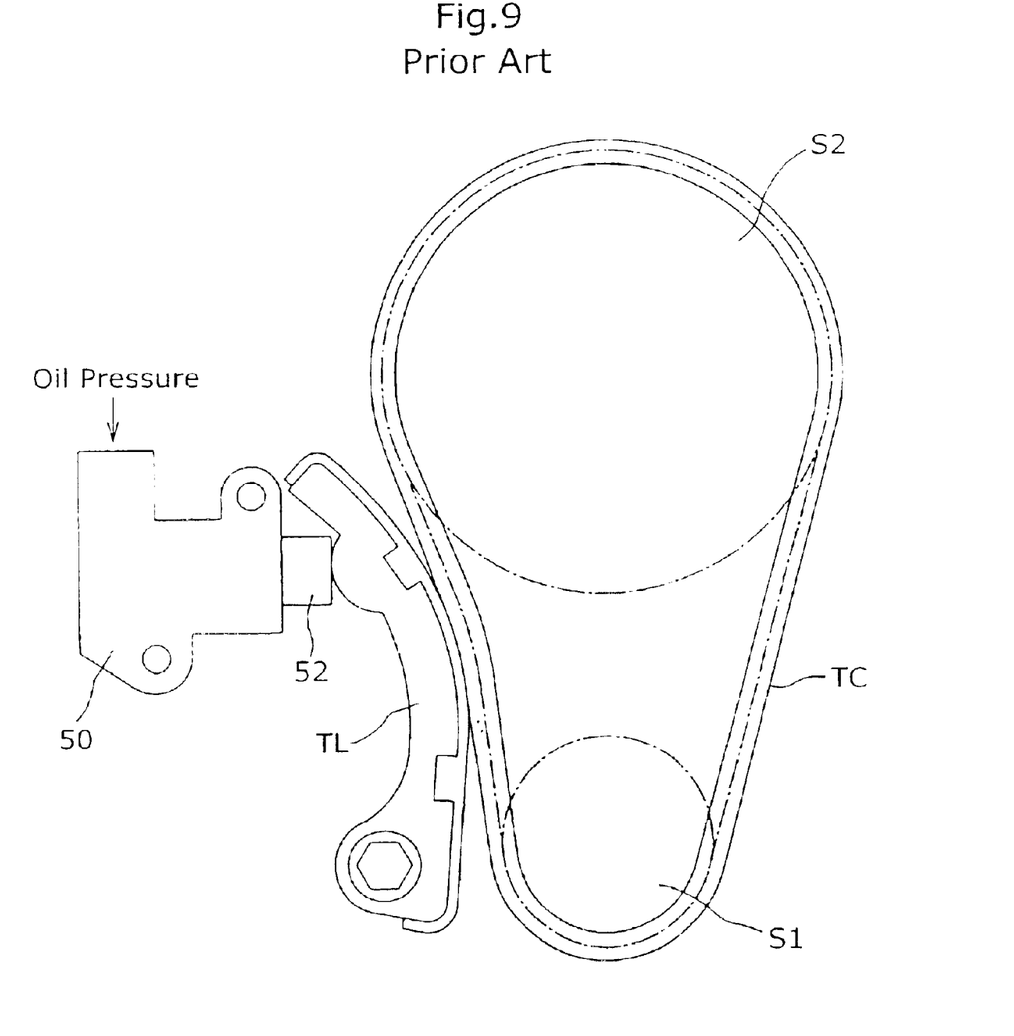
FIG. 9 is a schematic view showing a timing transmission incorporating a conventional hydraulic tensioner having a relief valve mechanism.

These tensioners are typically installed in the manner depicted in FIG. 9, where a hydraulic tensioner 50 is shown in conjunction with a timing transmission in FIG. 9. The tensioner 50 adjusts chain tension through a tension lever TL, and a relief valve (not shown in FIG. 9) is provided in the tensioner to relieve excess tension generated in the timing chain TC, when the timing chain is stretched as it transmits power.

Figure 10:
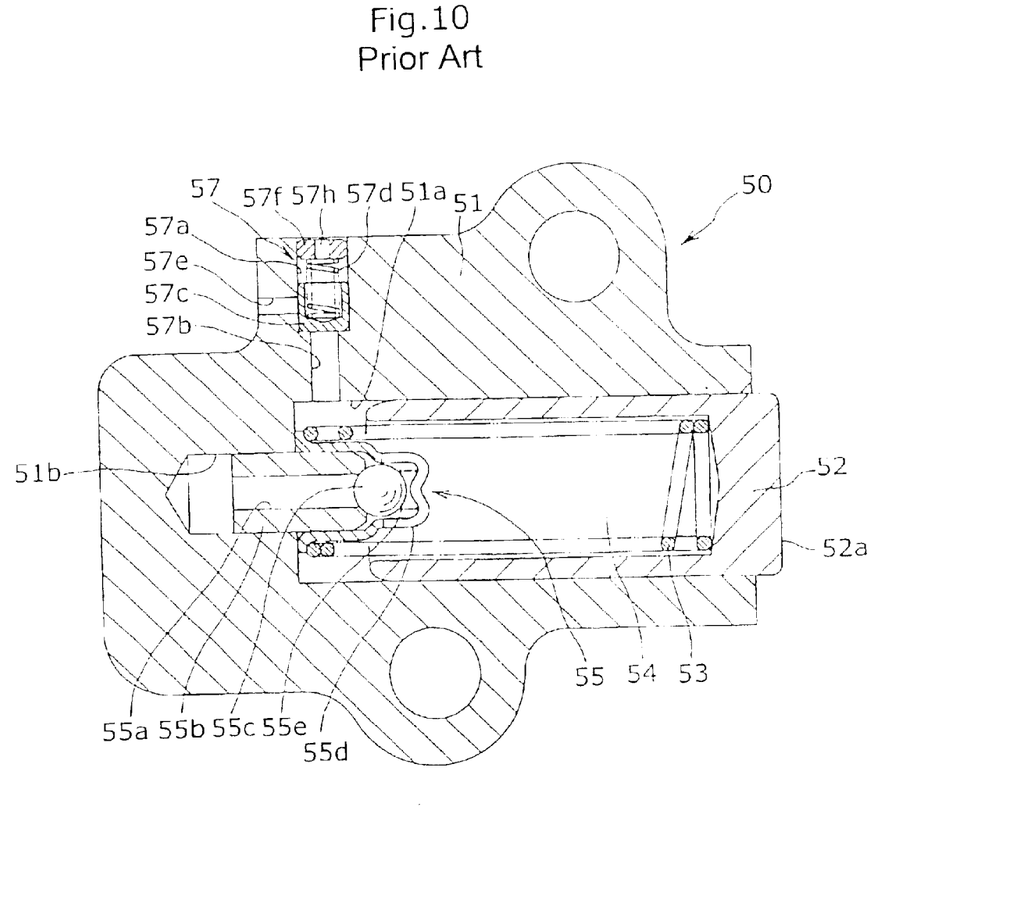
FIG. 10 is a cross-sectional view of the conventional hydraulic tensioner with a relief valve mechanism.

The relief valve mechanism is shown in a cross-sectional view of the tensioner in FIG. 10. The tensioner comprises a housing, or tensioner body, 51, and a hollow plunger 52, slidably fitting into a blind plunger-accommodating hole 51a formed in the housing 51. An end wall 52a of the plunger 52 is outside the housing. A spring 53, inside the plunger 52, biases the plunger in the projecting direction. A high pressure oil chamber 54 is constituted by the interior of the plunger and a part of the blind hole 51a behind the plunger. A check valve mechanism 55 is provided at the bottom of the plunger-accommodating hole 51a, and a relief valve mechanism 57 is provided in the housing 51 at a location such that it communicates with the oil chamber 54 through a passage 57b, which leads to an opening in the side wall of the plunger-accommodating hole 51a, near the bottom of the hole.

The check valve mechanism 55 comprises a ball seat 55b having an oil passage 55a. The seat 55b is press-fit into a hole 51b formed at a bottom portion of the plunger-accommodating hole 51a. A check ball 55c, which can abut the ball seat 55b, is held in close proximity to the seat by a retainer 55d. A spring 55e, shown schematically, biases the check ball 55c toward the ball seat 55b. An oil supply passage (not shown), for supplying oil from a source of oil under pressure to the high pressure oil chamber 54, communicates with hole 51b in the housing 51. The check valve mechanism 55 permits the flow of oil into the high-pressure oil chamber 54, but blocks flow out of the high pressure oil chamber 54 in the reverse direction.

The relief valve mechanism 57 comprises a valve element fitting recess 57a formed in the housing 51, the oil passage 57b, which provides fluid communication between the high pressure oil chamber 54 and the valve element fitting recess 57a, a cup-shaped valve element 57c slidably fitting into the recess 57a with the bottom surface of the valve element 57c facing the oil passage 57b, a spring 57d, which biases the valve element 57c toward the oil passage 57b, a relief hole 57e, provided near the oil passage 57b in a side wall of the valve element fitting recess 57a, and a plug 57f press-fit into the recess 57a from the outside. The relief hole 57e provides fluid communication between the inside of the valve element fitting recess 57a and the outside of the housing 51.

When the oil pressure in the high pressure oil chamber 54 exceeds a predetermined pressure, the valve element 57c is moved backward against the biasing force of the spring 57d, and the oil passage 57b communicates with the relief hole 57e, thereby reducing the oil pressure in the high pressure chamber 54. The inside of the valve element fitting recess 57a is filled with oil to ensure smooth operation of the valve element 57c, and the oil is supplied and discharged through an oil hole 57h bored in the plug 57f as the valve element 57c moves backward and forward.

With the engine operating normally, when the timing chain loosens, the biasing force of the spring 53 in the above-described hydraulic tensioner 50 causes the plunger 52 to project. As the plunger projects, the check ball 55c separates from the seat 55b, and oil, supplied from an oil pressure source such as an oil pump or the like, flows into the oil chamber 54 through the oil supply passage (not shown). The oil supply passage communicates with the hole 51b and the oil passage 55a in the ball seat 55b, so that the oil supplied to the oil chamber 54 maintains tension in the timing chain.

When the chain is under excess tension, the plunger 52 receives a thrust load from the tensioner lever (FIG. 9) in a direction opposite to the direction in which the plunger is biased by spring 53. The check valve mechanism 55 then prevents backflow of oil from the high pressure oil chamber 54, and the oil, being non-compressible, prevents the return of the plunger 52. However, the valve element 57c of the relief valve mechanism 57 responds to the excess oil pressure in chamber 54 by sliding against the biasing force of spring 57d. A slight backward movement of the valve element 57c absorbs a small amount of excess tension in the timing chain.

When the thrust applied to the plunger 52 further increases, causing the valve element 57c to move farther in recess 57a, the oil passage 57b communicates with the relief hole 57e, permitting discharge of oil from the high pressure oil chamber 54 to the outside of the tensioner 50. Thus, the oil pressure in the high pressure oil chamber 54 decreases, and excessive tension of the timing chain is absorbed.

When the oil pressure in chamber 54 decreases as oil is discharged from the tensioner, the biasing force of the spring 57d causes the valve element 57c to close the relief hole 57e, to maintain the oil pressure in chamber 54 at a preset value. If the oil pressure in chamber 54 decreases excessively, the check valve mechanism 55 allows oil to flow into chamber 54, to return the oil pressure to a normal level.

In the conventional hydraulic tensioner 50, as shown in FIG. 10, a condition of excess tension can occur while oil continues to flow from the high pressure oil chamber to the relief valve mechanism. When this condition occurs, the valve element 57c of the relief valve mechanism 57 moves backward rapidly and collides with the plug 57f, generating hitting sounds.

The spring 57d, which biases the valve element 57c, can also become compressed past its elastic limit, with the result that the biasing force exerted by the spring 57d gradually decreases, and the relief valve ceases to function properly. To avoid these problems, it has been proposed to provide a buffer of rubber or the like between the valve element 57c and the plug 57f in the valve element fitting recess 57a. However, this has not proven to be an effective solution, since the insertion of the buffer required additional assembly manpower and increases production cost.

Accordingly, the objects of the invention are to overcome the above-mentioned problems, and to provide an inexpensive, hydraulic tensioner with a structurally simple relief valve mechanism capable of avoiding hitting sounds in the relief valve structure, and avoiding wearing out and breakage of the biasing spring in the relief valve. It is also an object of the invention to provide a hydraulic tensioner which instantaneously adjusts to rapid variations in chain tension, and operates reliably when excess oil has been supplied, when tension in the timing chain increases rapidly, and when the oil pressure inside the high pressure oil chamber has reached an excessive level.

SUMMARY OF THE INVENTION

The hydraulic tensioner in accordance with the invention comprises a tensioner housing, and a plunger for exerting a tensioning force on a flexible transmission medium. The plunger projects from a blind hole in the tensioner housing, and the blind hole and the plunger together define a high pressure oil chamber. A passage is provided for delivering oil into the high pressure chamber from a high pressure oil supply, and a relief valve is connected to the high pressure oil chamber for effecting immediate pressure reduction to avoid excessive high pressure in the chamber. The relief valve comprises a valve element receiving bore communicating with an oil supply opening, a valve element, slidable forward and backward in the valve element receiving bore, a spring, biasing the valve element toward the oil supply opening, and an oil relief hole in a peripheral wall of the valve element receiving bore, at a position where it is closed when the valve element is moved backward by a rapid increase in oil pressure at the oil supply opening, whereby a quantity of oil is trapped in the valve element receiving bore for damping of the movement of said valve element.

When the valve element moves backward to a position past its usual range of positions, as a result of a rapid increase in oil pressure from the oil supply hole, the oil relief hole is closed by the relief valve element. Trapped oil blocks further backward movement of the relief valve, damping its movement so that collision between the relief valve element and the end of the valve element receiving bore is avoided.

The oil supply opening communicates with the high-pressure oil chamber through an oil reservoir and a check valve, and preferably also through a separate path comprising an oil pressure adjusting passage.

When the oil supply opening communicates with the high-pressure oil chamber through the oil pressure adjusting passage, excessive high pressure in the high-pressure oil chamber is absorbed and relieved.

An oil supply opening in the valve element receiving bore is allowed to communicate with the high-pressure oil chamber. Thus, when the pressure in the high pressure oil chamber becomes abnormally high due to a rapid increase in the tensile force in the timing chain, the pressure is instantaneously absorbed and relieved.

DETAILED DESCRIPTION OF THE PREFERRED EMBODIMENTS

Figure 1:
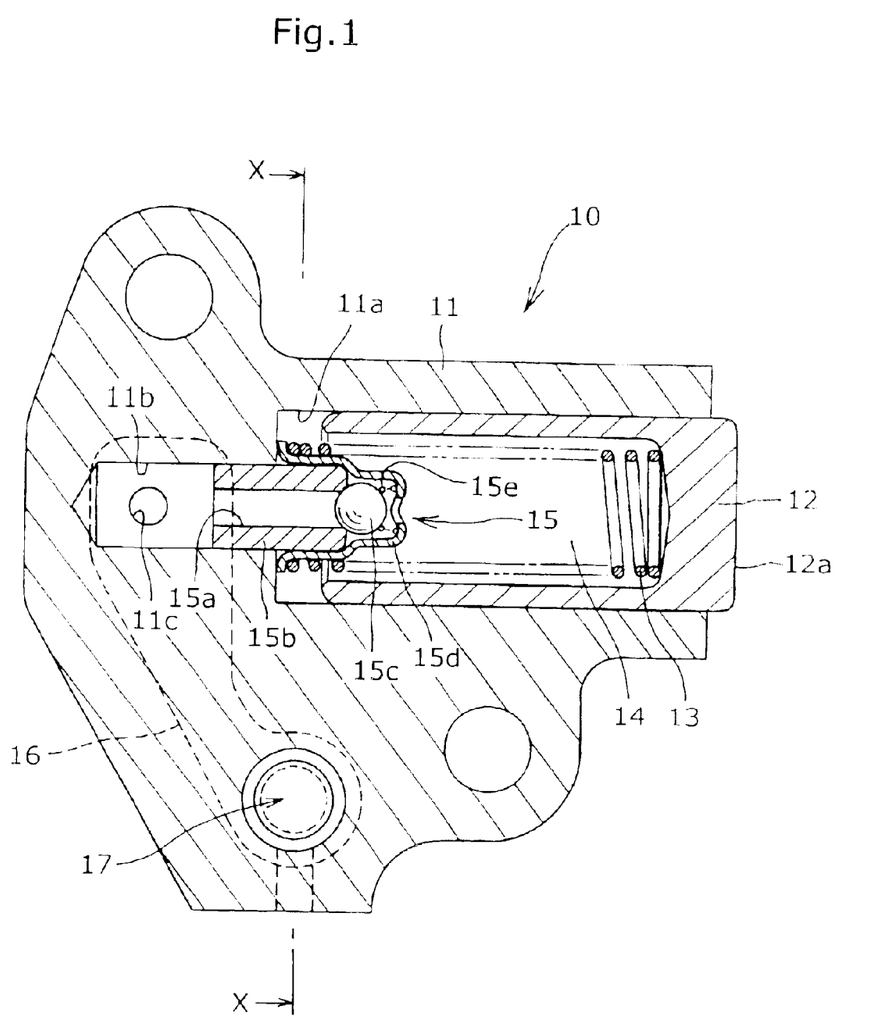
FIG. 1 is a planar cross-sectional view of a hydraulic tensioner with a relief valve mechanism in accordance with a first embodiment of the invention.
Figure 2:
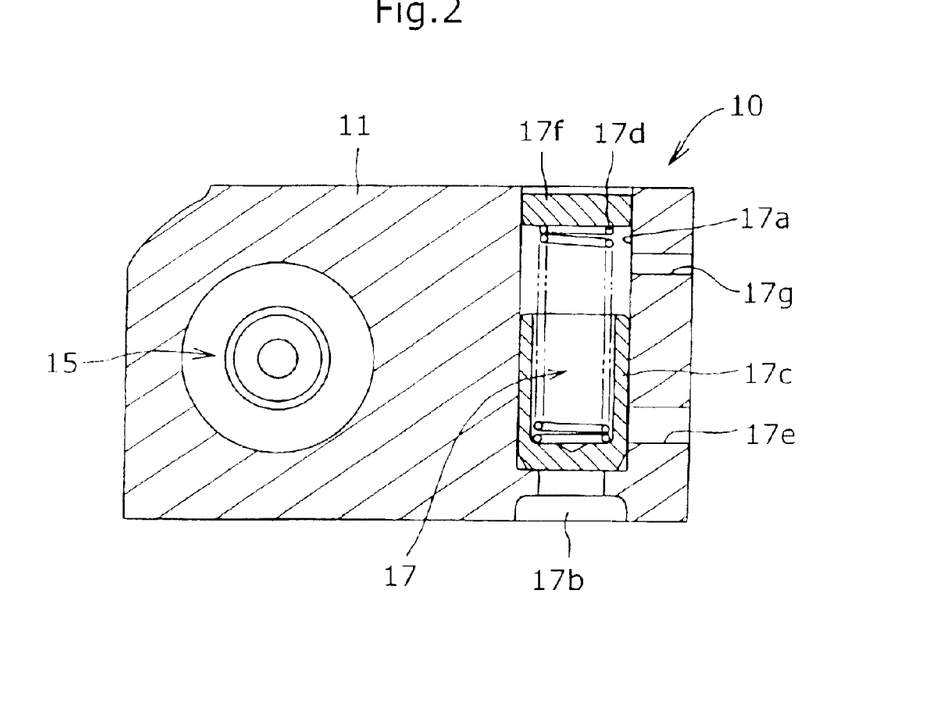
FIG. 2 is cross-sectional view on section plane X—X of FIG. 1, showing the relief valve mechanism in its resting condition.
Figure 3:
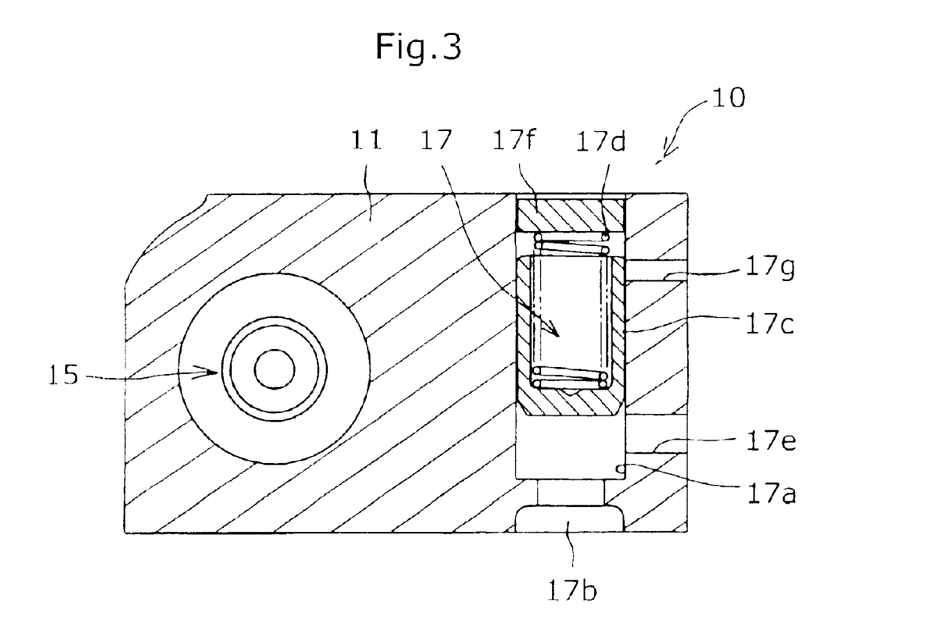
FIG. 3 is cross-sectional view on section plane X—X of FIG. 1, showing the relief valve mechanism in its operated condition, in which an oil relief hole is opened.

Referring first to FIGS. 1–3, a tensioner 10, in accordance with first embodiment of the invention, comprises a housing 11, and a hollow plunger 12 slidably fitting into a plunger accommodating hole 11a with a bottom formed in the housing. A bottom wall 12a of the plunger 12 extends outside the housing, and a spring 13, inserted in the plunger 12, biases the plunger in the projecting direction. A high pressure oil chamber 14 is formed between the housing 11 and the plunger 12, and constituted in part by the interior of the plunger. A check valve mechanism 15 is provided at the bottom portion of the plunger accommodating hole 11a formed in the housing 11 for flow of oil into the chamber 14. A gap between the plunger and the housing allows flow of oil outward from the chamber. A reservoir 16, stores oil supplied from an oil pressure source such as an oil pump or the like (not shown) to the check valve mechanism 15. A relief valve mechanism 17 is provided for limiting the pressure of the oil in the tensioner when oil is supplied in excessive quantities to the reservoir 16.

The check valve mechanism 15 comprises a ball seat 15b having an oil passage 15a, press-fit into a hole 1ib formed at an end of the plunger accommodating hole 11a. The check valve mechanism also comprises a check ball 15c, which can be brought into contact with this ball seat 15b, a retainer 15d for holding the check ball 15c, and a spring 15e, which biases the check ball 15c toward the ball seat 15b. An oil supply passage 11c, formed in the housing 11, communicates with hole 1ib to supply oil from a source such as an oil pump or the like to the high pressure oil chamber 14. The check valve mechanism 15 allows flow of oil into the high pressure oil chamber 14, but blocks reverse flow of oil out of the high pressure oil chamber 14.

The relief valve mechanism 17, as shown in FIGS. 2 and 3, comprises a cylindrical bore 17a formed in the housing 11, an oil supply opening 17b for introducing oil to the reservoir 16 (FIG. 1) and to the bore 17a, a cup-shaped valve element 17c slidably fitting into the bore 17a and oriented with its bottom surface toward the oil supply opening 17b, a relief hole 17e in the peripheral wall of the bore 17a, near the oil supply opening 17b, and providing fluid communication between the bore 17a and the outside of the housing 11, and a plug 17f, press-fit to the bore 17a from the outside.

In the peripheral wall of the bore 17a, there is also an oil relief hole 17g. This oil relief hole is located at a position such that it is closed when the valve element 17c moves backward by excessive oil pressure at the oil supply opening 17b. The inside of the bore 17a is filled with oil to promote smooth operation of the valve element 17c, and the oil is discharged and drawn in through the oil relief hole 17g as valve element 17c moves backward and forward during normal operation of the engine with which the tensioner is associated.

Referring again to FIG. 1, when the timing chain (not shown) loosens in the normal operation of the engine, the plunger 12 is moved in the projecting direction by a biasing force of spring 13. At the same time, the check ball 15c separates from the ball seat 15b, and oil is supplied to the high pressure oil chamber 14 through the supply oil passage 11c, hole 11b, and passage 15b in the ball seat 15b, so that tension is maintained in the timing chain.

When the timing chain is under excessive tension, the plunger 12 is urged in the retracting direction by the tensioner lever (not shown). The check valve mechanism 15 blocks reverse flow of oil out of the high-pressure oil chamber 14, and the oil in chamber 14, which is non-compressible, prevents retraction of the plunger 12. However, the valve element 17c of the relief valve 17 (FIG. 2) responds to excessive oil pressure in the reservoir 16 by sliding slightly backward against the biasing force of spring 17d, so that excessive force exerted by the plunger 12 on the chain through the tensioner lever (not shown) is avoided.

If the pressure in reservoir 16 is further increased, and the valve element 17c of the relief valve mechanism 17 moves farther backward, the oil supply hole 17b is allowed to communicate with the relief hole 17e, so that discharge of the oil from the reservoir 16 to the outside is permitted. Thus, the oil pressure in the reservoir 16 is reduced, and excessive tension in the timing chain is absorbed.

If oil pressure in the reservoir 16 is reduced as a result of the discharge of oil from the tensioner, the biasing force of the spring 17d causes the valve element 17c to close the relief hole 17e, so that oil pressure in the high-pressure oil chamber 14 is maintained at a predetermined value. If the oil pressure in the high-pressure oil chamber 14 is reduced excessively, the check valve mechanism 15 allows oil to flow into the high-pressure oil chamber 14, thereby returning the oil pressure in the high-pressure oil chamber 14 to its normal level.

When excessive pressure is applied to the reservoir 16, continued flow of oil from the oil supply opening to the relief valve mechanism 17 can cause a backlash to occur, such that the valve element 17c moves rapidly backward as a result of pressure significantly in excess of the biasing force of spring 17d on the relief valve element 17c.

When the valve element 17c is moved backward, as a result of backlash, beyond a predetermined position, the oil relief hole 17g is closed by the side wall of the valve element 17c as shown in FIG. 3. Oil filling the gap between the valve element 17c and the plug 17f can no longer escape, and a damping action, blocking further backward movement of the valve element 17c, is effected. As a result, collision of the valve element 17c with the plug 17f is avoided, and no hitting sounds are generated. The oil, which flowed without stopping from the oil supply opening 17b, is gradually discharged to the outside through the relief hole 17e, so that the pressure in the reservoir 16 is returned to a normal level.

Thus, the relief valve mechanism 17 suppresses the backlash of the valve element 17c resulting from a rapid increase in pressure, and allows appropriate adjustment of the oil pressure.

Figure 4:
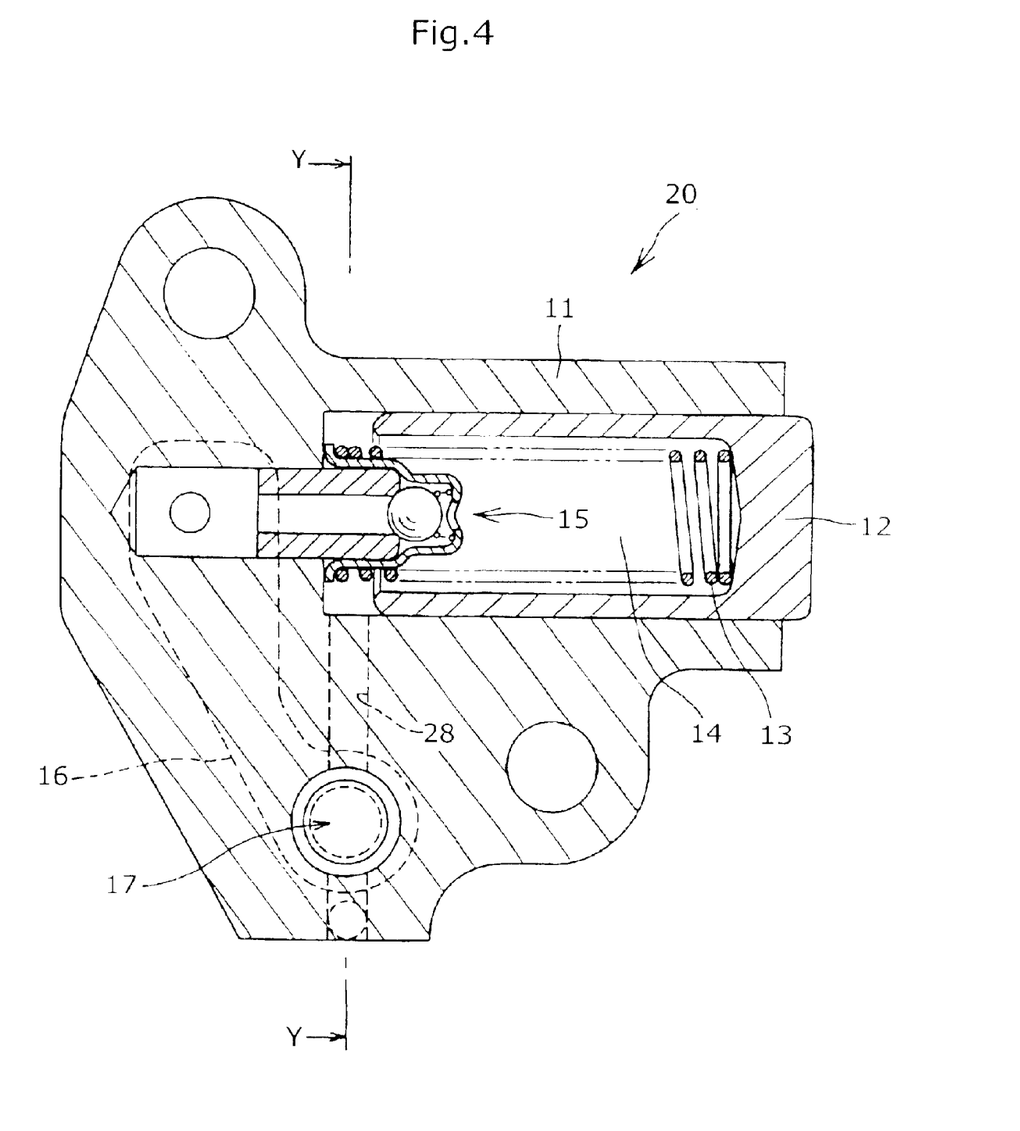
FIG. 4 is a planar cross-sectional view of a tensioner in accordance with a second embodiment of the invention.
Figure 5:
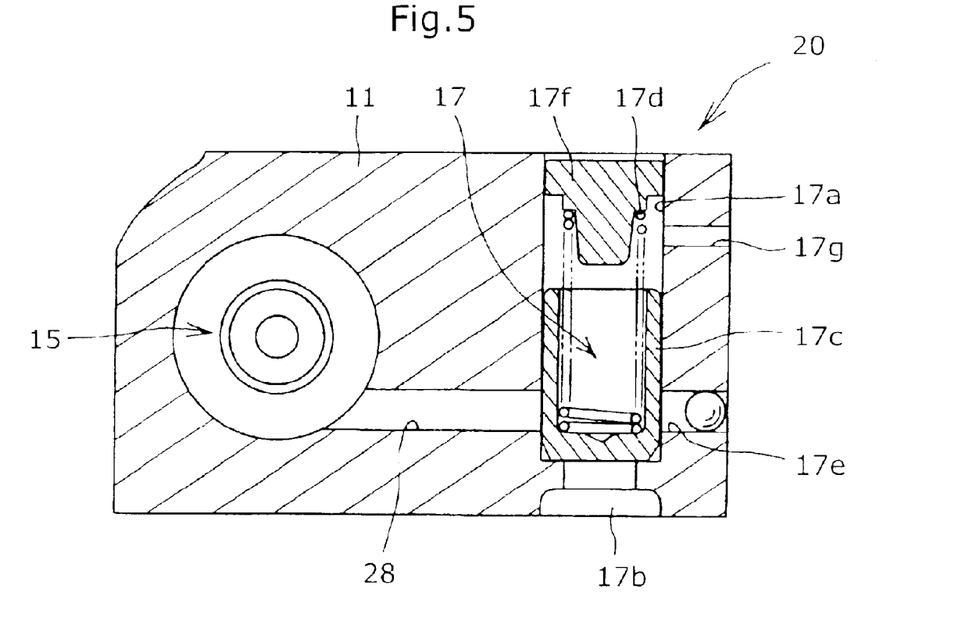
FIG. 5 is cross-sectional view on section plane Y—Y of FIG. 4, showing the relief valve mechanism of FIG. 4 in its resting condition.
Figure 6:
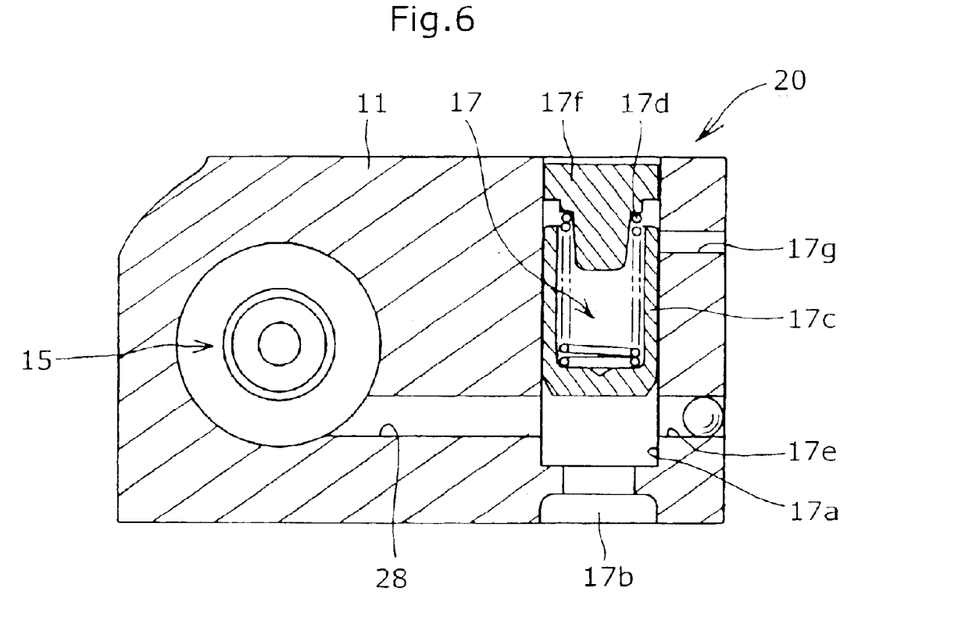
FIG. 6 is cross-sectional view on section plane Y—Y of FIG. 4, showing the relief valve mechanism of FIG. 4 in its operated condition, in which an oil relief hole is opened.

In a second embodiment of the invention, illustrated in FIGS. 4, 5 and 6, as in the tensioner 10 of the first embodiment, a tensioner 20 comprises a housing 11, a hollow plunger 12 slidably fitting into a plunger accommodating hole with a bottom formed in the housing. A bottom wall of the plunger 12 extends outside the hosing and a spring 13, inserted in the plunger 12 biases the plunger in the projection direction. A high pressure oil chamber 14 is formed between the housing 11 and the plunger 12, and constituted in part by the interior of the plunger. A check valve mechanism 15 is provided at the bottom portion of the plunger accommodating hole. A reservoir 16, stores oil supplied from an oil pressure source such as an oil pump or the like (not shown) to the check valve mechanism 15. A relief valve mechanism 17 is provided for limiting the pressure of the oil in the tensioner when oil is supplied in excessive quantities to the reservoir 16.

An oil supply opening 17b communicates with a bore 17a, and, through an oil pressure adjusting passage 28, with the high-pressure oil chamber 14. When the amount of oil supplied through this oil pressure adjusting passage 28 from an oil pressure source is excessive, the excess oil is discharged to the outside of the tensioner. Thus, excessively high pressure, which is likely to occur in the high-pressure oil chamber 14, is immediately absorbed and relieved. This tensioner exhibits instantaneous adjustment in response to rapid tension variations in the timing chain.

Figure 7:
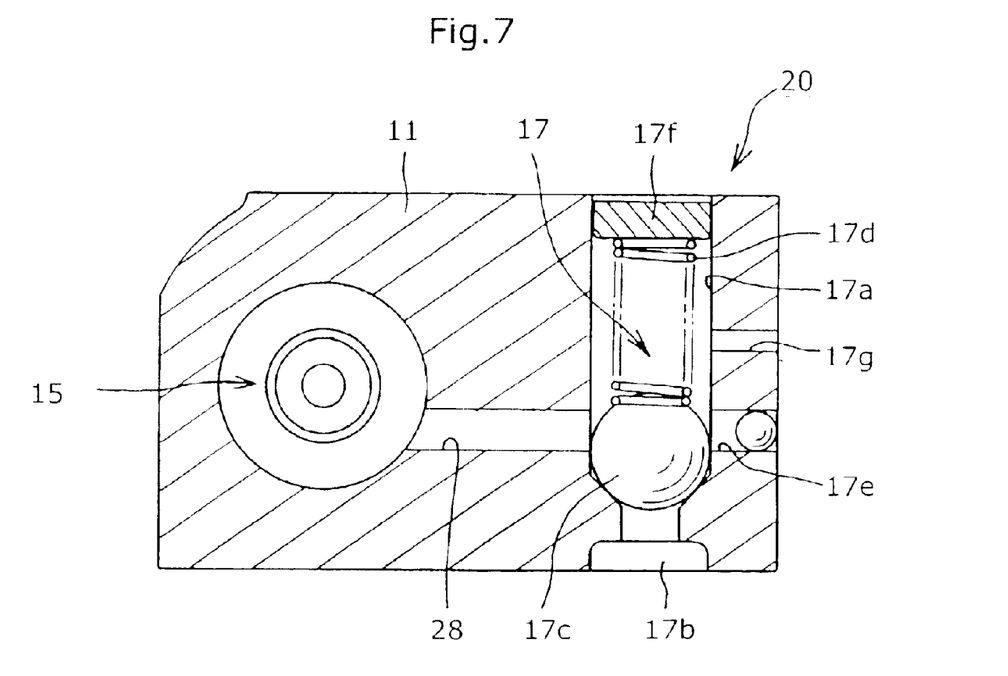
FIG. 7 is a sectional view showing a modified version of the hydraulic tensioner of the second embodiment of the invention.

In the embodiment illustrated in FIG. 7, instead of a cup-shaped relief valve element as in the previously described embodiments, the relief valve element 17c is ball-shaped. A cost reduction can be achieved by adopting commercial available balls having suitable specifications.

Figure 8:
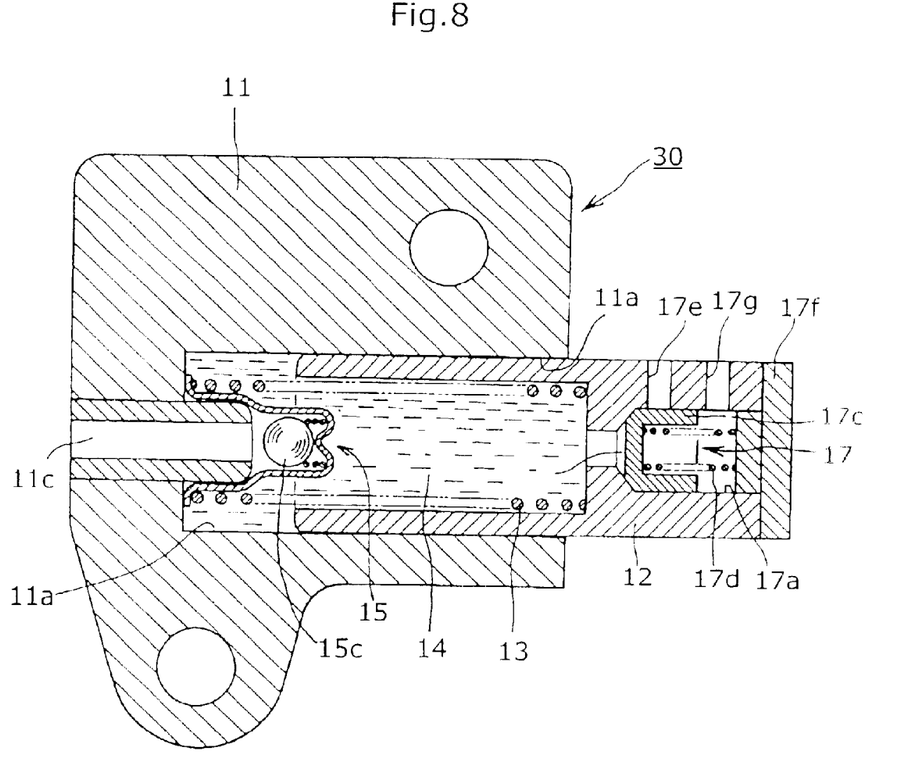
FIG. 8 is a cross-sectional view of a hydraulic tensioner with a relief valve mechanism according to a third embodiment of the invention.

In still another embodiment, shown in FIG. 8, the relief valve mechanism is incorporated into the plunger of a tensioner 30. This tensioner has features in common with the tensioners described previously. Elements common to tensioner 30 and the previously described tensioners are similarly numbered. A detailed explanation is unnecessary and will be omitted.

The relief valve mechanism 17 of the tensioner 30, has the same configuration and functions as the relief valve mechanism 17 of the first embodiment, shown in FIGS. 1–3, but is directly incorporated into the front end portion of the plunger 12.

Tensioner 30 exhibits the same effects as the tensioner of the first embodiment when the oil supply opening 17b in the first embodiment is allowed to communicate with the high-pressure oil chamber 14. In tensioner 30, however, abnormal high pressure in the high pressure oil chamber 14, which occurs when tensile force in the timing chain increases rapidly, is instantaneously absorbed and removed by the relief valve, which is in direct communication with the high pressure chamber.

Since the relief valve mechanism 17 is directly incorporated into the front end portion of the plunger 12, the size of the housing 11 can be decreased, and miniaturization and overall weight reduction of the entire tensioner can be realized.

The hydraulic tensioner with a relief valve mechanism according to the invention produces the following unique effects.

First, oil is sealed between the valve element and the plug of the relief valve when the valve element moves to an extent such that it closes the oil relief hole 17g. The sealed oil exerts a damping effect on the backward movement of the valve element, prevents collision between the valve element and the plug, and eliminates hitting sounds. The damping effect also prevents the wearing out and breakage of the biasing spring of the relief valve, and improves the durability of the relief valve mechanism.

Second, where an oil pressure adjusting passage is provided, as in the embodiment of FIGS. 4–6, excessively high pressure, which is likely to occur in the high-pressure oil chamber, is immediately absorbed and relieved. Thus, the tensioner responds instantaneously to rapid tension variation in the timing chain.

Third, where an oil supply opening in the valve element fitting portion is allowed to communicate with the high-pressure oil chamber, abnormally high pressure in the high-pressure oil chamber, which occurs when tensile force in the timing chain increases rapidly, can be instantaneously absorbed and relieved.

Finally, when the relief valve mechanism is directly incorporated into the plunger, the tensioner can be miniaturized, its weight can be reduced, and number of parts, the number of the production steps, and the production cost can be reduced.

We claim:

1. A hydraulic tensioner comprising a tensioner housing, a plunger for exerting a tensioning force on a flexible transmission medium, the plunger being disposed in a blind hole in the tensioner body and projecting therefrom, said blind hole and said plunger together defining a high pressure oil chamber, a passage for delivering oil into said chamber from a high pressure oil supply, and a relief valve, connected to said high pressure oil chamber, for effecting immediate pressure reduction to avoid excessive high pressure in said chamber;

wherein said relief valve comprises a valve element receiving bore communicating with an oil supply opening, a valve element, slidable forward and backward in the valve element receiving bore, a spring, biasing the valve element toward the oil supply opening, and an oil relief hole in a peripheral wall of said valve element receiving bore, at a position where it is closed by said valve element when said valve element is moved backward by a rapid increase in oil pressure at said oil supply opening, whereby a quantity of oil is trapped in said valve element receiving bore for damping of the movement of said valve element.

2. A hydraulic type tensioner according to claim 1, wherein said oil supply opening communicates with said high-pressure oil chamber.

3. A hydraulic type tensioner according to claim 1, in which said oil supply opening communicates with said high-pressure oil chamber, through a check valve.

4. A hydraulic type tensioner according to claim 1, in which said oil supply opening communicates with said high-pressure oil chamber, through an oil pressure adjusting passage.

5. A hydraulic type tensioner according to claim 1, in which said oil supply opening communicates with said high-pressure oil chamber, both through a first path comprising an oil pressure adjusting passage and through a second path comprising an oil reservoir and a check valve, said first and second paths being separate from each other.

* * * * *